United States Patent
Liao et al.

(10) Patent No.: US 10,969,664 B2
(45) Date of Patent: *Apr. 6, 2021

(54) DAMPING STRUCTURE, GIMBAL ASSEMBLY, AND UNMANNED AERIAL VEHICLE

(71) Applicant: SZ DJI TECHNOLOGY CO., LTD., Shenzhen (CN)

(72) Inventors: Ran Liao, Shenzhen (CN); Hao Liu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/896,936

(22) Filed: Jun. 9, 2020

(65) Prior Publication Data

US 2020/0301259 A1 Sep. 24, 2020

Related U.S. Application Data

(63) Continuation of application No. 16/255,599, filed on Jan. 23, 2019, now Pat. No. 10,684,535, which is a (Continued)

(30) Foreign Application Priority Data

Jul. 29, 2016 (CN) .......................... 201620812047.2

(51) Int. Cl.
*G03B 17/56* (2021.01)
*B64D 47/08* (2006.01)
(Continued)

(52) U.S. Cl.
CPC ........... *G03B 17/561* (2013.01); *B64D 47/08* (2013.01); *F16F 15/02* (2013.01); *F16M 11/105* (2013.01);
(Continued)

(58) Field of Classification Search
USPC ........................................................ 396/428
See application file for complete search history.

(56) References Cited

U.S. PATENT DOCUMENTS 5,710,945 A 1/1998 Thompson
9,085,362 B1 * 7/2015 Kilian .................... B64C 25/68
(Continued)

FOREIGN PATENT DOCUMENTS

CN 204956943 U * 1/2016
CN 204956943 U 1/2016
(Continued)

OTHER PUBLICATIONS

The World Intellectual Property Organization (WIPO) International Search Report for PCT/CN2016/103164 dated Apr. 26, 2017 6 pages.

*Primary Examiner* — Clayton E. LaBalle
*Assistant Examiner* — Warren K Fenwick
(74) *Attorney, Agent, or Firm* — Anova Law Group, PLLC

(57) ABSTRACT

A damping structure configured for connecting a gimbal with a carrier includes a first connecting member connectable with the gimbal, a second connecting member connectable with the carrier, and a damper elastically disposed between the first connecting member and the second connecting member. The damper includes a damper body, a first fixed portion, and a second fixed portion. The first fixed portion and the second fixed portion are configured to connect with two opposite sides of the damper body, respectively. The first fixed portion includes an elastic ring sleeve configured to sleeve couple with the first connecting member. The second fixed portion is connected with the second connecting member.

20 Claims, 4 Drawing Sheets

Related U.S. Application Data continuation of application No. PCT/CN2016/103164, filed on Oct. 25, 2016.

(51) Int. Cl.
*F16M 11/20* (2006.01)
*F16M 11/18* (2006.01)
*F16M 13/02* (2006.01)
*F16F 15/02* (2006.01)
*F16M 11/12* (2006.01)
*G03B 15/00* (2021.01)
*F16M 11/10* (2006.01)
*B64C 39/02* (2006.01)

(52) U.S. Cl.
CPC ........... *F16M 11/123* (2013.01); *F16M 11/18* (2013.01); *F16M 11/2064* (2013.01); *F16M 13/02* (2013.01); *G03B 15/006* (2013.01); *B64C 39/024* (2013.01); *F16M 2200/041* (2013.01); *F16M 2200/044* (2013.01)

(56) References Cited

U.S. PATENT DOCUMENTS

| | | | |
|---|---|---|---|
| 10,684,535 B2 * | 6/2020 | Liao | F16M 13/02 |
| 2012/0316685 A1 * | 12/2012 | Pettersson | F16M 11/18 |
| | | | 700/275 |
| 2015/0156385 A1 * | 6/2015 | Wang | G05D 1/0094 |
| | | | 348/144 |
| 2017/0261064 A1 * | 9/2017 | Liu | F16F 15/085 |
| 2019/0154109 A1 * | 5/2019 | Liu | F16M 13/02 |

FOREIGN PATENT DOCUMENTS

| | | | | |
|---|---|---|---|---|
| CN | 205327435 U | 6/2016 | | |
| JP | 4319844 B2 | 8/2009 | | |
| KR | 20140124881 A | 10/2014 | | |
| WO | 2017129137 A1 | 8/2017 | | |
| WO | WO-2017129137 A1 * | 8/2017 | ............ | B64D 47/08 |

\* cited by examiner

DAMPING STRUCTURE, GIMBAL ASSEMBLY, AND UNMANNED AERIAL VEHICLE

CROSS-REFERENCE TO RELATED APPLICATIONS

This application is a continuation of application Ser. No. 16/255,599, filed on Jan. 23, 2019, which is a continuation application of International Application No. PCT/CN2016/103164, filed on Oct. 25, 2016, which claims priority to Chinese Patent Application No. 201620812047.2, filed on Jul. 29, 2016, the entire contents of all of which are incorporated herein by reference.

TECHNICAL FIELD

The present disclosure relates to the technology field of aircrafts and, more particularly, to a damping structure for a gimbal assembly, a gimbal assembly that includes the damping structure, and an unmanned aerial vehicle that includes the gimbal assembly.

BACKGROUND

In conventional designs of gimbals, damping structures such as damping balls are typically adopted to suppress the vibration of the gimbals, thereby providing a stable gimbal for photographing. A damping ball is typically connected to a connecting member through a snap fit coupling structure. However, because the damping ball is made of an elastic material, the damping ball can separate from the connecting member when the damping ball deforms under a large force. As a result, the gimbal may lose the damping effect and the photographing devices may be damaged.

SUMMARY

According to a first aspect of the present disclosure, a damping structure configured to connect a gimbal with a carrier includes a first connecting member connectable with the gimbal. The damping structure also includes a second connecting member connectable with the carrier. The damping structure also includes a damper elastically disposed between the first connecting member and the second connecting member. The damping structure further includes a separation-proof member connected with the damper and configured to cause the damper to abut against at least one of the first connecting member and the second connecting member through a stretching force generated by vibration of the damper.

According to a second aspect of the present disclosure, a gimbal assembly includes a gimbal configured to carry a load. The gimbal assembly also includes a damping structure configured to connect the gimbal with a carrier. The damping structure includes a first connecting member connectable with the gimbal. The damping structure also includes a second connecting member connectable with the carrier. The damping structure also includes a damper disposed between the first connecting member and the second connecting member. The damping structure further includes a separation-proof member connected with the damper and configured to cause the damper to abut against at least one of the first connecting member and the second connecting member.

According to a third aspect of the present disclosure, an unmanned aerial vehicle includes an aircraft body and a gimbal assembly. The gimbal assembly includes a gimbal configured to carry a load. The gimbal assembly also includes a damping structure configured to connect the gimbal with the aircraft body. The damping structure includes a first connecting member connectable with the gimbal. The damping structure also includes a second connecting member connectable with the aircraft body. The damping structure also includes a damper disposed between the first connecting member and the second connecting member. The damping structure further includes a separation-proof member connected with the damper and configured to cause the damper to abut against at least one of the first connecting member and the second connecting member.

BRIEF DESCRIPTION OF THE DRAWINGS

To better describe the technical solutions of the various embodiments of the present disclosure, the accompanying drawings showing the various embodiments will be briefly described. As a person of ordinary skill in the art would appreciate, the drawings show only some embodiments of the present disclosure. Without departing from the scope of the present disclosure, those having ordinary skills in the art could derive other embodiments and drawings based on the disclosed drawings without inventive efforts.

ELEMENTS LIST

Figure 1:
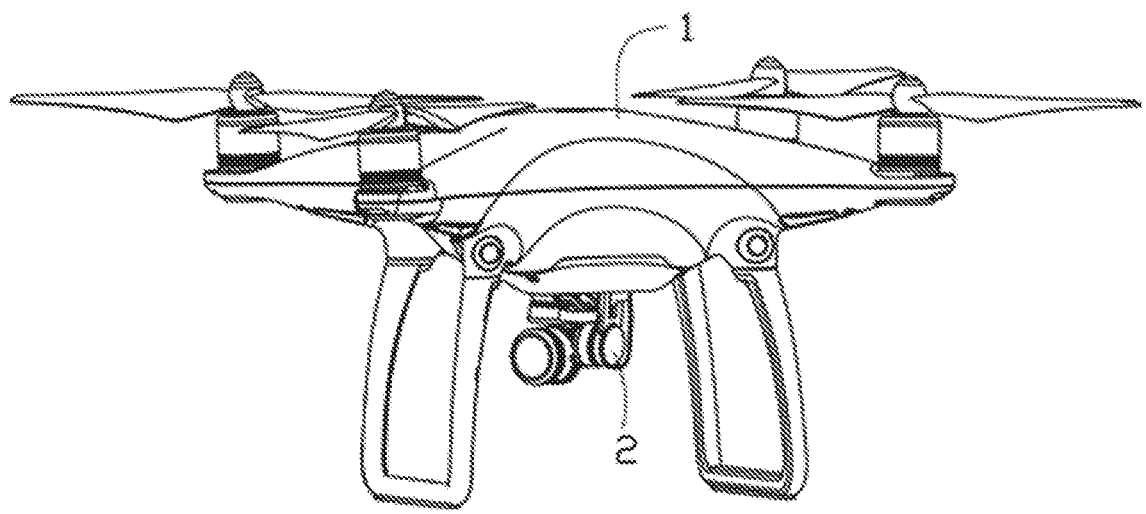
FIG. 1 is a perspective view of an unmanned vehicle, according to an example embodiment.

| Element | Number |
|---|---|
| Unmanned vehicle | 1000 |
| Aircraft body | 1 |
| Gimbal assembly | 2 |
| Damping structure | 20 |
| Connecting assembly | 201 |
| First connecting member | 200 |
| Connecting plate | 2000 |
| Connecting arm | 2004 |
| First end | 2005 |
| Second end | 2006 |
| Neck portion | 2004a |
| Through hole | 2004b |
| Second connecting member | 204 |
| First connecting portion | 2040 |
| Second connecting portion | 2042 |
| Snap fit hole | 2042a |
| Flange | 2042b |
| Resting surface | 2042c |
| Damper | 202 |
| Damper body | 2020 |
| First through hole | 2021 |
| Second through hole | 2023 |
| First fixed portion | 2022 |
| Second fixed portion | 2024 |
| Snap-in portion | 2024a |
| Blocking portion | 2024b |
| Receiving hole | 2026 |
| Separation-proof member | 206 |
| Insertion portion | 2061 |
| Head portion | 2061a |
| Abutting portion | 2062 |
| Gimbal | 22 |

-continued

| | |
|---|---|
| Connecting hole | 220 |
| Load | 23 |

Details of the disclosed technical solution will be explained below with reference to the accompanying drawings.

DETAILED DESCRIPTION OF THE EMBODIMENTS

Technical solutions of the present disclosure will be described in detail with reference to the drawings, in which the same numbers refer to the same or similar elements unless otherwise specified. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure. In addition, when there is no obvious conflict, the following embodiments and the features included in the embodiments can be combined.

As used herein, when a first component (or unit, element, member, part, piece) is referred to as "coupled," "mounted," "fixed," "secured" to or with a second component, it is intended that the first component may be directly coupled, mounted, fixed, or secured to or with the second component, or may be indirectly coupled, mounted, or fixed to or with the second component via another intermediate component. The terms "coupled," "mounted," "fixed," and "secured" do not necessarily imply that a first component is permanently coupled with a second component. The first component may be detachably coupled with the second component when these terms are used. When a first component is referred to as "connected" to or with a second component, it is intended that the first component may be directly connected to or with the second component or may be indirectly connected to or with the second component via an intermediate component. The connection may include mechanical and/or electrical connections. The connection may be permanent or detachable. The electrical connection may be wired or wireless. When a first component is referred to as "disposed," "located," or "provided" on a second component, the first component may be directly disposed, located, or provided on the second component or may be indirectly disposed, located, or provided on the second component via an intermediate component. When a first component is referred to as "disposed," "located," or "provided" in a second component, the first component may be partially or entirely disposed, located, or provided in, inside, or within the second component. The terms "perpendicular," "horizontal," "vertical," "left," "right," "up," "upward," "upwardly," "down," "downward," "downwardly," and similar expressions used herein are merely intended for describing relative positional relationships.

When a first item is fixedly coupled, mounted, or connected to a second item, the term "fixedly" means "securely," and is relative to movably. When the first item is fixedly coupled, mounted, or connected to the second item, the first item does not move relative to the second item. The first item may be permanently coupled to the second item, or may be detachably coupled to the second item. When a first item is "fixed" with a second item, the first item is securely connected with the second item. The connection may be permanent or detachable.

It should be understood that in the present disclosure, relational terms such as first and second, etc., are only used to distinguish an entity or operation from another entity or operation, and do not necessarily imply that there is an actual relationship or order between the entities or operations. The terms "comprising," "including," or any other variations are intended to encompass non-exclusive inclusion, such that a process, a method, an apparatus, or a device having a plurality of listed items not only includes these items, but also includes other items that are not listed, or includes items inherent in the process, method, apparatus, or device. Without further limitations, an item modified by a term "comprising a . . . " does not exclude inclusion of another same item in the process, method, apparatus, or device that includes the item.

Unless otherwise defined, all the technical and scientific terms used herein have the same or similar meanings as generally understood by one of ordinary skill in the art. As described herein, the terms used in the specification of the present disclosure are intended to describe example embodiments, instead of limiting the present disclosure. The term "and/or" used herein includes any suitable combination of one or more related items listed.

Further, when an embodiment illustrated in a drawing shows a single element, it is understood that the embodiment may include a plurality of such elements. Likewise, when an embodiment illustrated in a drawing shows a plurality of such elements, it is understood that the embodiment may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one embodiment but not another embodiment may nevertheless be included in the other embodiment.

FIG. 1 shows an unmanned vehicle 1000 in accordance with an embodiment of the present disclosure. In some embodiments, the unmanned vehicle 1000 may be any suitable type of unmanned aircraft, such as rotorcraft, fixed-wing aircraft, or an aircraft having a combined fixed-wing and rotor. The rotor may be a single rotor, twin rotors, three rotors, four rotors, six rotors, eight rotors, etc. In some embodiments, the unmanned vehicle may be an unmanned vehicle in the water (e.g., unmanned boat or ship, unmanned submarine, etc.), an unmanned vehicle on the ground (e.g., driverless vehicle), an unmanned vehicle in the air (e.g., unmanned aerial vehicle), etc. In some embodiments, the unmanned vehicle 1000 may be an unmanned aerial vehicle ("UAV"). For convenience of illustration, the UAV is used as an example of the unmanned vehicle in the following discussion. Hence, the unmanned vehicle 1000 may also be referred to as UAV 1000 for convenience of discussion. As shown in FIG. 1, the UAV 1000 may include an aircraft body 1 and a gimbal assembly 2 mounted on the aircraft body 1.

The aircraft body 1 may carry the gimbal assembly 2 coupled with the aircraft body 1. Thus, the aircraft body 1 is the carrier of the gimbal assembly 2. In some embodiments, the aircraft body 1 may include a structure having a hollow central portion. A plurality of devices or components may be disposed inside the aircraft body 1, such as a circuit board, a controller, sensors configured to measure the attitude of the UAV 1000 and information relating to the surrounding environment, such as inertial measurement unit ("IMU"), altitude sensor, temperature sensor, etc.

Figure 2:
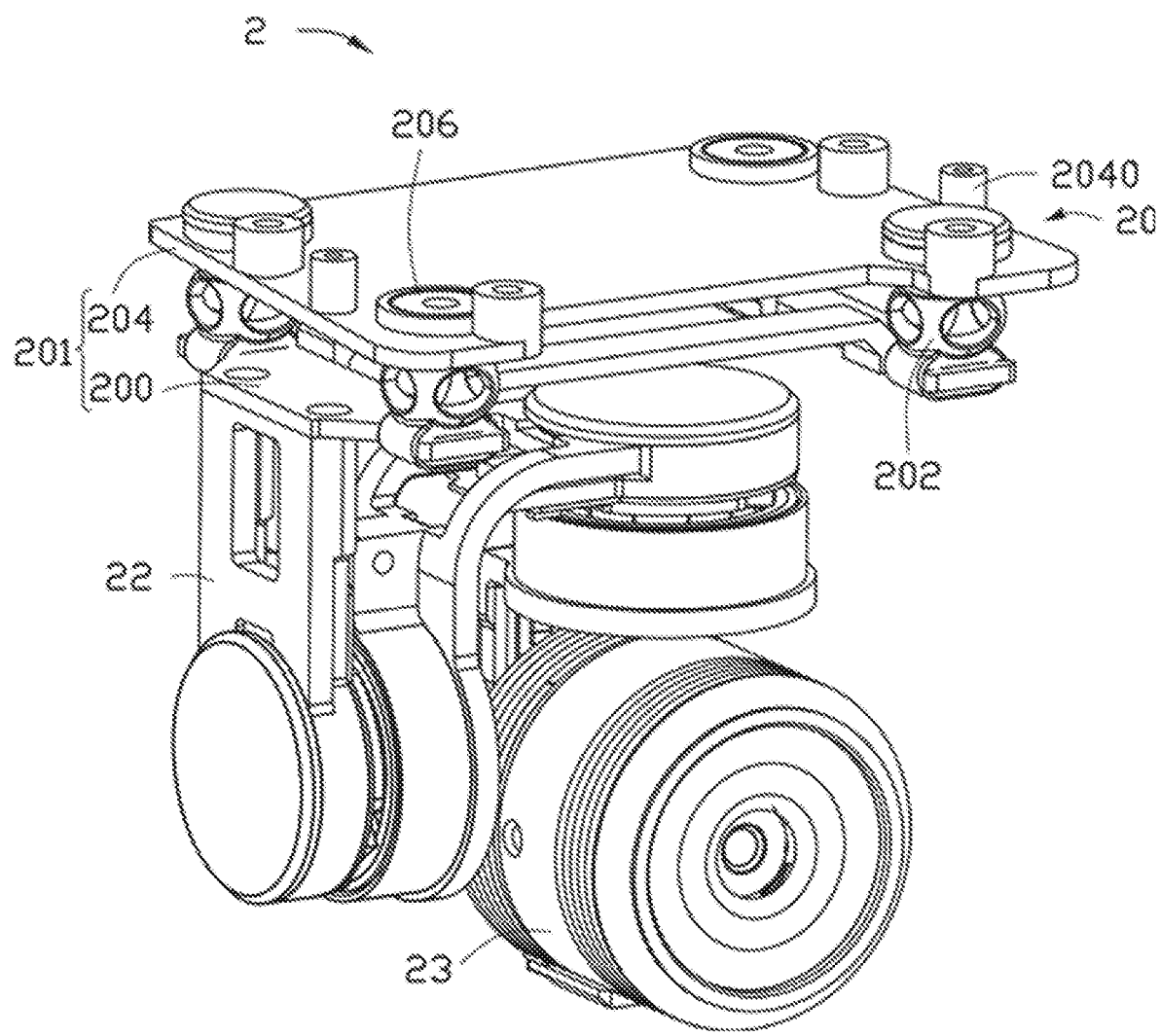
FIG. 2 is an enlarged perspective view of a gimbal assembly of the unmanned vehicle of FIG. 1, according to an example embodiment.

FIG. 2 shows that the gimbal assembly 2 may include a damping structure 20, a gimbal 22, and a load 23. The damping structure 20 may be coupled with the aircraft body 1 and the gimbal 22. In some embodiments, the damping structure 20 may be entirely disposed inside the aircraft body 1. The gimbal 22 may be configured to carry the load 23. The gimbal 22 may be a single-axis gimbal, a dual-axis gimbal, or a three-axis gimbal. The gimbal 22 and the load 23 may be disposed outside of the aircraft body 1. The load 23 may be any suitable devices that may be carried by the gimbal 22, such as sensors and imaging devices. In some embodiments, the load 23 may include an imaging device, such as a camera.

Figure 3:
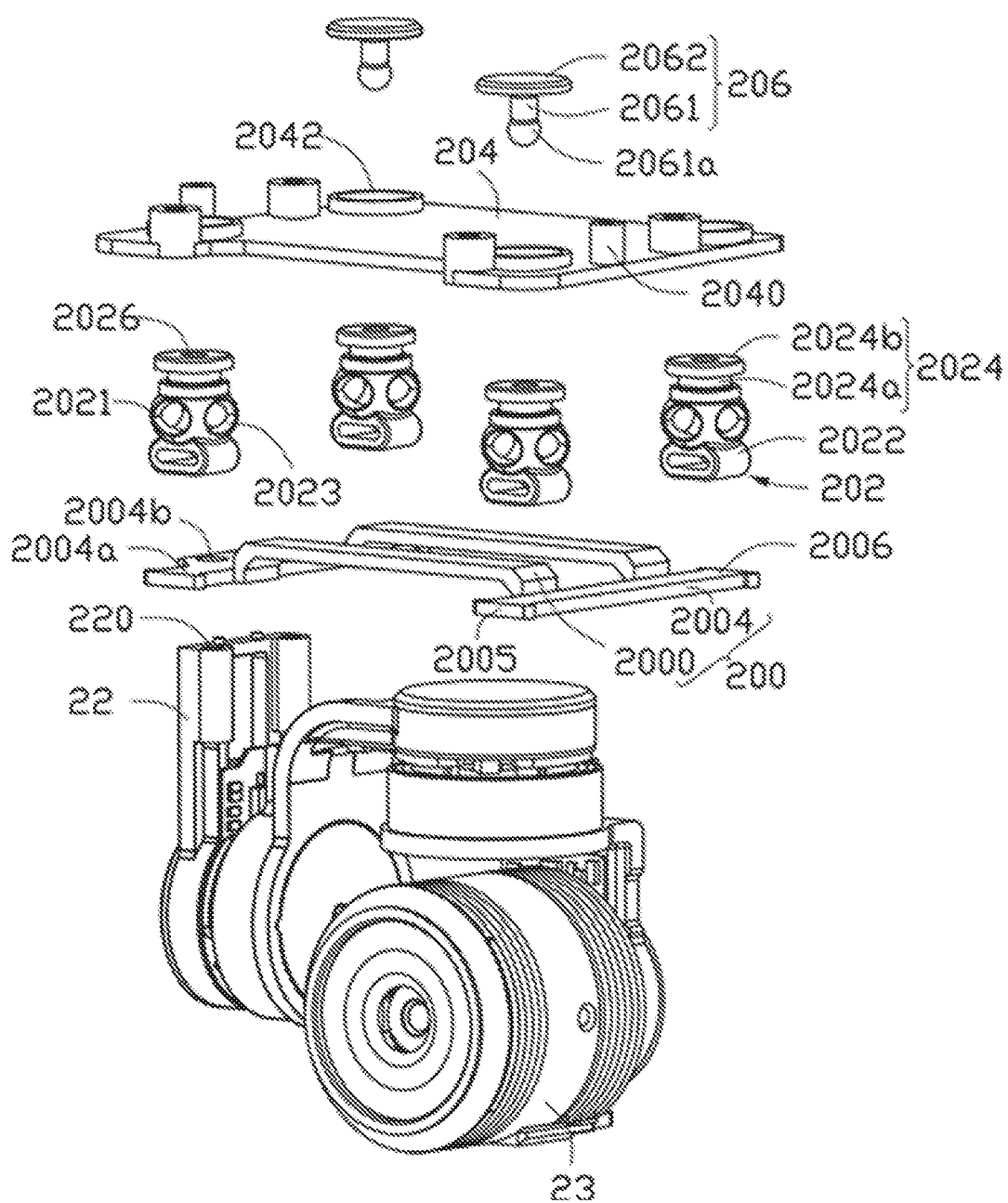
FIG. 3 is an exploded view of the gimbal assembly of FIG. 2 from another perspective, according to an example embodiment.

FIG. 3 shows that the damping structure 20 may include one or more dampers 202 and a connecting assembly 201 configured to connect the gimbal assembly 2 and the aircraft body 1. The connecting assembly 201 may include a first connecting member 200 and a second connecting member 204. The first connecting member 200 may be coupled with the gimbal assembly 2, and the second connecting member 204 may be coupled with the aircraft body 1. The damper 202 may be configured to allow the first connecting member 200 to move relative to the second connecting member 204 due to elastic deformation of the damper 202, thereby reducing vibrations.

In some embodiments, the first connecting member 200 may have a plate shape, including a connecting plate 2000 and two connecting arms 2004 disposed at two opposite ends of the connecting plate 2000. In some embodiments, the connecting plate 2000 may include two longitudinal strips separated at a distance. Thus, the weight of the connecting plate 2000 may be reduced. Correspondingly, the weight of the first connecting member 200 may also be reduced. In some embodiments, the strips of the connecting plate 2000 may be disposed in parallel with one another and separated at a distance from one another. In some embodiments, the connecting plate 2000 may be disposed according to practical needs. For example, the number of the longitudinal strips included in the connecting board 2000 may be changed. In some embodiments, the strips may be disposed to have a predetermined tilting angle between the strips (rather than being in parallel with one another). In some embodiments, the connecting plate 2000 may be an integral piece.

The two connecting arms 2004 may be respectively connected with two opposite ends of the connecting plate. In some embodiments, each connecting arm 2004 may have a substantially longitudinal strip shape. Each connecting arm 2004 may include a first end 2005 and a second end 2006 opposite the first end 2005. Each first end 2005 and each second end 2006 may be connected with a damper 202. Each connecting arm 20004 may include a neck portion 2004a at locations adjacent the first end 2005 and the second end 2006. In some embodiments, the neck portion 2004a includes a depressed portion on a side in the width direction. That is, the width of the neck portion 2004a may be smaller than the corresponding width of the first end 2005 or the corresponding width of the second end 2006. In some embodiments, both opposite sides in the width direction of each neck portion 2004a may have depressed portions. Each neck portion 2004a may be connected with a corresponding damper 202. The depressed portion on each neck portion 2004a may restrain the damper 202 from being separated from the corresponding first end 2005 or the second end 2006, thereby securely coupling the first connecting member 200 and the damper 202.

In some embodiments, at least one of the connecting arms 2004 may be coupled with the gimbal 22. The connecting arm 2004 that is connected with the gimbal 22 may be provided with a through hole 2004b. The gimbal 22 may include a connecting hole 220 corresponding to each through hole 2004b. In some embodiments, the connecting hole 220 may be a threaded hole. The connecting arm 2004 may be fixedly connected with the gimbal 22 through a bolt inserted into the through hole 2004b and threadedly coupled with the connecting hole 220. In some embodiments, the connecting arm 2004 may be connected with the gimbal using other suitable methods, such as snap fit, gluing, riveting, welding, interference fit, etc. In some embodiments, the connecting arm 2004 and the gimbal 22 may be integrally formed as a single piece.

In some embodiments, the connecting plate 2000 and the connecting arm 2004 may be integrally formed. In some embodiments, various components of the first connecting member 200 may not be integrally formed. Rather, various components of the first connecting member 200 may be fixed together using any suitable methods, such as threaded coupling, snap fit, gluing, riveting, welding, and interference fitting, etc.

Figure 4:
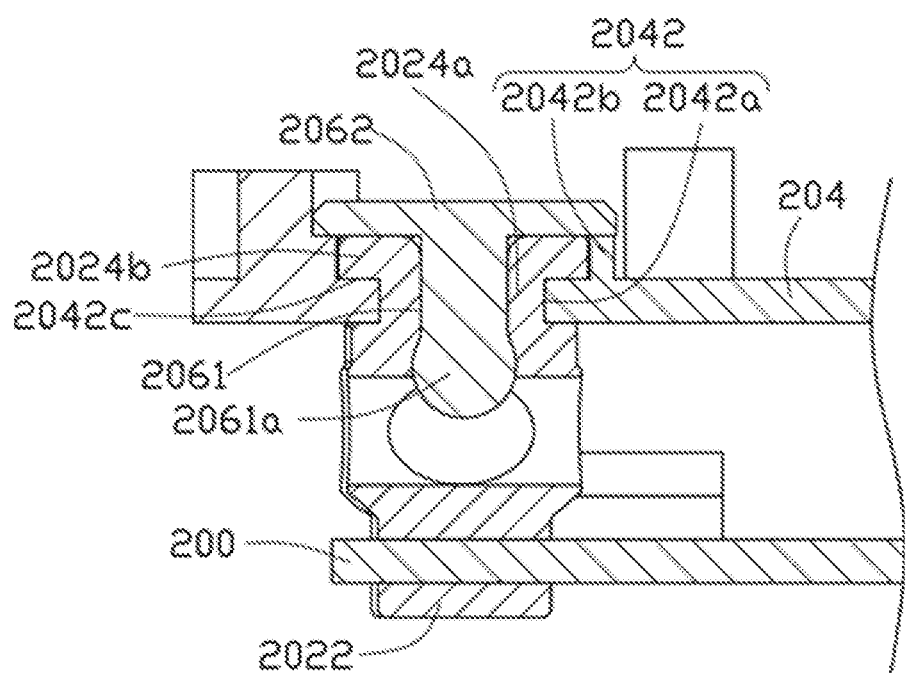
FIG. 4 is a cross-sectional view of a portion of the gimbal assembly of FIG. 1, according to an example embodiment.

As shown in FIGS. 2-4, the second connecting member 204 may have a substantially plate shape. The second connecting member 204 may include a first connecting portion 2040 and a second connecting portion 2042. The first connecting portion 2040 may be configured to connect the second connecting member 204 with the aircraft body 1. The second connecting portion 2042 corresponds to the damper 202, and may be configured to connect with the damper 202.

In some embodiments, the first connecting portion 2040 may be a protruding column with an internal threaded hole. The protruding column may be formed on a surface of the second connecting member 204. In some embodiments, the first connecting portion 2040 may be formed on a surface of the second connecting member that faces against the first connecting member 200. In some embodiments, the first connecting portion 2040 may be a cylindrical protruding column. In some embodiments, the first connecting portion 2040 may be other suitable shapes, such as a prismatic protruding column, an oval protruding column, a lumbar-shaped protruding column, etc. In some embodiments, the first connecting portion 2040 may not be a protruding column. Instead, the first connecting portion 2040 may be a threaded hole directly disposed on the surface of the second connecting member 204, and the aircraft body 1 may have a protruding column corresponding to the first connecting portion 2040. When connecting with the aircraft body 1, the second connecting member 204 may be fastened with the aircraft body 1 through a fastener inserted through the first connecting portion, such as a threaded bolt or a screw.

In some embodiments, the second connecting member 204 and the aircraft body 1 may be connected using other suitable methods, such as snap fit, gluing, riveting, welding, and interference fitting, etc. In some embodiments, the second connecting member 204 and the aircraft body 1 may be integrally formed.

In some embodiments, the second connecting portion 2042 may include a snap fit hole 2042a corresponding to the damper 202, and a flange 2042b corresponding to the snap fit hole 2042a. The snap fit hole 2042a is configured to snap fit with the damper 202 to connect the damper 202 with the second connecting member 204. In some embodiments, the snap fit hole 2042a may have a circular shape, although any other suitable shapes may be used, such as triangle, square, polygon, oval, and other regular or irregular shapes.

In some embodiments, the flange 2042b may protrude from a side surface of the second connecting member 204 that faces against the first connecting member 200. The flange 2042b may surround the snap fit hole 2042a. The flange 2042b may be separated from a circumferential edge of the snap fit hole 2042a at a predetermined distance. A resting surface 2042c may be provided between the flange 2042b and the circumferential edge of the snap fit hole 2042a. In some embodiments, the flange 2042b has a substantially circular ring shape. The flange 2042b may have other suitable shapes, such as oval ring shape, polygon ring shape, etc. In some embodiments, the flange 2042b may have a continuous ring shape, or a non-continuous ring shape formed by a plurality of segments. The resting surface 2042c may be at the same height as a side surface of the second connecting member 204 that faces against the first connecting member 200. In some embodiments, the resting surface 2042c may be higher or lower than the side surface of the second connecting member 204 that faces against the first connecting member 200. When the damper 202 snaps into the snap fit hole 2042a, the flange 2042b may contact a side of the corresponding damper 202, restraining the damper 202 from moving laterally relative to the second connecting member 204, thereby increasing the stability of the connection between the second connecting member 204 and the corresponding damper 202, and reducing the shaking between the second connecting member 204 and the corresponding damper 202.

In some embodiments, the flange 2042b may be omitted.

In some embodiments, the damper 202 may include a damper body 2020, a first fixed portion 2022, and a second fixed portion 2024. The first fixed portion 2022 and the second fixed portion 2024 may be connected with two opposite sides of the damper body 2020, respectively. The first fixed portion 2022 may be connected with the first connecting member 200, and the second fixed portion 2024 may be connected with the second connecting member 204.

In some embodiments, the damper body 2020 may have a substantially spherical shape. The damper body 2020 may include a first through hole 2021 and a second through hole 2023. The facing direction of the opening of the first through hole 2021 and the facing direction of the opening of the second through hole 2023 may be substantially perpendicular to one another. The center point of the first through hole 2021 and the second through hole 2023 may coincide with the center point of the damper 202. The damper body 2020 may include multiple through holes to achieve better damping effect. The damper body 2020 may be made of a suitable material, such as an elastic material (e.g., rubber, silicone, etc.). In some embodiments, the damper body 2020 may have other shapes, such as a polygonal prism, an oval sphere, etc. In some embodiments, the first through hole 2021 and the second through hole 2023 may be omitted. In some embodiments, the damper body 2020 may include other through holes in addition to the first through hole 2021 and the second through hole 2023.

In some embodiments, the first fixed portion 2022 may be configured to connect with the first end 2005 or the second end 2006 of the connecting arm 2004 of the first connecting member 200. The second fixed portion 2024 may be configured to connect with the second connecting member 204. In some embodiments, the first fixed portion 2022 may be a ring sleeve made of an elastic material, which can be sleeve coupled to the first end 2005 or the second end 2006, thereby fixedly connecting the damper 202 with the first connecting member 200.

The second fixed portion 2024 may include a snap-in portion 2024a and a blocking portion 2024b connected with the snap-in portion 2024a. The blocking portion 2024b may be connected with an end of the snap-in portion 2024a that is distal from the damper body 2020. The size of the blocking portion 2024b may be greater than the size of the snap-in portion 2024a. The blocking portion 2024b may form a protruding edge protruding from a circumferential side surface of the snap-in portion 2024a and located at the circumference of the snap-in portion 2024a. In some embodiments, the size of the circumference of the snap-in portion 2024a may be substantially the same as the size of the corresponding snap fit hole 2042a. In some embodiments, the snap-in portion 2024a and the blocking portion 2024b may both have a substantially cylindrical shape. In some embodiments, the blocking portion 2024b and the snap-in portion 2024a may share a common axis. In some embodiments, the diameter of the blocking portion 2024b may be greater than the diameter of the snap-in portion 2024a. In some embodiments, the thickness of the blocking portion 2024b and the height of the flange 2042b may be substantially the same. In some embodiments, the thickness of the blocking portion 2024b may be slightly greater than the height of the flange 2042b. In some embodiments, as shown in FIG. 4, a circumferential surface of the blocking portion 2024b is configured to abut against an inner surface of the flange 2042b of the second connecting member 204.

In some embodiments, the blocking portion 2024b and the snap-in portion 2024a may have any suitable shapes, such as a prismatic protruding column, an oval protruding column, a lumbar-shaped protruding column, etc. In some embodiments, the blocking portion 2024b and the snap-in portion 2024a may have the same or different shapes.

In some embodiments, the first fixed portion 2022 and the second fixed portion 2024 may form an integral piece with the damper body 2020. In some embodiments, the first fixed portion 2022 and the second fixed portion 2024 may be separately formed, and may be fixedly connected with the damper body 2020 through a suitable connecting method, such as gluing, etc.

In some embodiments, the damping structure 20 may include a separation-proof member 206. The separation-proof member 206 may be configured to restrain the corresponding damper 202 from separating from the second connecting member 204. Each separation-proof member 206 may include an insertion portion 2061 and an abutting portion 2062 connected with the insertion portion 2061. In some embodiments, the insertion portion 2061 may have a substantially cylindrical shape, and the abutting portion 2062 may have a substantially circular plate shape. The diameter of the abutting portion 2062 may be greater than the diameter of the insertion portion 2061, rendering the separation-proof member 206 to have a substantially "T" shape. In some embodiments, the insertion portion 2061 and the abutting portion 2062 may have other shapes, which may be changed based on the practical needs. In some embodiments, the length of the insertion portion 2061 may be smaller than the height of the damper 202. In other words, when the insertion portion 2061 is inserted into the damper 202, the insertion portion 2061 does not penetrate throughout the damper 202. Therefore, the separation-proof member 206 does not transfer vibration between the gimbal 22 and the aircraft body 1.

In some embodiments, the insertion portion 2061 may include a head portion 2061a at an end distal from the abutting portion 2062. The head portion 2061a may have a substantially spherical shape, and the diameter of the head portion 2061a may be greater than the diameter of the insertion portion 2061. In some embodiments, the shape of the insertion portion 2061 may be other shapes. Corresponding to the insertion portion 2061, the damper 202 may include a receiving hole 2026. The receiving hole 2026 may penetrate throughout the second fixed portion 2024 and extend into a portion of the damper body 2020. In some embodiments, the receiving hole 2026 may be connected and aligned with the first through hole 2021 and the second through hole 2023. In some embodiments, the inner diameter of the receiving hole 2026 may be slightly smaller than the diameter of the insertion portion 2061. When the insertion portion 2061 inserts into the receiving hole 2026, the outer surface of the insertion portion 2061 may tightly fit with the inner surface of the receiving hole 2026. The friction force between the outer surface of the insertion portion 2061 and the inner surface of the receiving hole 2026 renders it difficult for the separation-proof member 206 to exit from of the receiving hole 2026. The head portion 2061a may further restrain the separation-proof member 206 from being separated from the receiving hole 2026.

In some embodiments, during assembling, the snap-in portion 2024a may snap-fit with the corresponding snap fit hole 2042a, and the blocking portion 2024b may rest on the resting surface 2042c. The circumferential side surface of the blocking portion 2024 may abut on or against the inner surface of the flange 2042b. Accordingly, the flange 2042b may restrain the lateral movement of the damper 202 relative to the second connecting member 204. When the damper 202 stretches due to the vibration, the blocking portion 2024b may abut against the resting surface 2042c to restrain the second fixed portion 2024 from separating from the second connecting member 204. The insertion portion 2061 of the separation-proof member 206 may be inserted into the corresponding receiving hole 2026 of the damper 202. The abutting portion 2062 may abut against the surface of the blocking portion 2024b. When the damper 202 stretches due to vibration, the damper 202 may cause the separation-proof member 206 to move together, which in turn causes the abutting portion 2062 to tightly abut against the blocking portion 2024b. As a result, the frictional resistance force experienced by the blocking portion 2024b may increase, thereby restraining the blocking portion 2024b from separating from the corresponding snap fit hole 2042a due to vibration. The disclosed structures may increase the stability and tightness of the connection between the second connecting member 204 and the damper 202.

In some embodiments, the first fixed portion 2022 may have a structure that is similar to the structure of the second fixed portion 2024, and the first connecting member 200 may include structures similar to the structures of the second connecting portion 2042.

The above described embodiments are exemplary embodiments of the present disclosure, and are not intended to limit the present disclosure. All modifications, equivalents, and improvements based on the spirit and principle of the present disclosure should fall within the scope of protection of the present disclosure.

What is claimed is:

1. A damping structure configured for connecting a gimbal with a carrier, comprising:
a first connecting member connectable with the gimbal;
a second connecting member connectable with the carrier;
a damper disposed between the first connecting member and the second connecting member, the damper including:
a damper body;
a first fixed portion including an elastic ring sleeve configured to sleeve couple with the first connecting member; and
a second fixed portion connected with the second connecting member,
wherein the first fixed portion and the second fixed portion are configured to connect with two opposite sides of the damper body, respectively.

2. The damping structure of claim 1, wherein the damper includes a damping ball.

3. The damping structure of claim 1, wherein the damper body has a spherical shape.

4. The damping structure of claim 1, wherein the damper body includes a first through hole and a second through hole.

5. The damping structure of claim 4, wherein:
a facing direction of an opening of the first through hole and a facing direction of an opening of the second through hole are perpendicular to one another; or
a center point of the first through hole and the second through hole coincides with a center point of the damper.

6. The damping structure of claim 1, wherein the first connecting member includes a depressed portion, and the first fixed portion is sleeve coupled with the first connecting member at the depressed portion.

7. The damping structure of claim 1, wherein:
the second fixed portion includes a snap-in portion and a blocking portion connected with the snap-in portion;
the second connecting member includes a snap fit hole corresponding to the snap-in portion, the snap-in portion being insertable into the snap fit hole; and
the blocking portion extends into the snap fit hole and rests on a surface of the second connecting member to restrain the snap-in portion from being separated from the snap fit hole.

8. The damping structure of claim 7, wherein:
a size of the blocking portion is greater than a size of the snap-in portion;
the blocking portion forms a protruding edge protruding from a circumferential side surface of the snap-in portion and located at the circumference of the snap-in portion; and
the protruding edge rests on the surface of the second connecting member.

9. The damping structure of claim 7, wherein:
the second connecting member includes a flange corresponding to the snap fit hole, the flange of the second connecting member surrounding the snap fit hole; and
a circumferential surface of the blocking portion is configured to abut against an inner surface of the flange of the second connecting member.

10. The damping structure of claim 9, wherein:
a thickness of the blocking portion is the same as a height of the flange of the second connecting member, or
the thickness of the blocking portion is greater than the height of the flange of the second connecting member.

11. The damping structure of claim 1, further comprising:
a separation-proof member connected with the damper and configured to cause the damper to abut against at least one of the first connecting member or the second connecting member through a stretching force generated by vibration of the damper.

12. The damping structure of claim 11, wherein:
the separation-proof member includes an insertion portion and an abutting portion connected with the insertion portion;

the insertion portion is configured to insert into the damper body; and the abutting portion is configured to abut against the damper body, such that the damper body abuts against the second connecting member due to a stretching force caused by vibration of the damper body.

13. The damping structure of claim 12, wherein:

the damper body includes a receiving hole penetrating throughout the second fixed portion and extending into the damper body; and the insertion portion is inserted into the receiving hole and frictionally contacts an inner surface of the receiving hole.

14. The damping structure of claim 12, wherein a length of the insertion portion is smaller than a height of the damper.

15. The damping structure of claim 12, wherein:

the insertion portion includes a head portion formed at an end of the insertion portion distal from the abutting portion;

a size of the head portion is greater than a size of the insertion portion; and the head portion is frictionally coupled with the damper.

16. A gimbal assembly, comprising:

a gimbal configured to carry a load; and a damping structure configured to connect the gimbal with a carrier, the damping structure including:

a first connecting member connectable with the gimbal;

a second connecting member connectable with the carrier;

a damper disposed between the first connecting member and the second connecting member, the damper including:

a damper body;

a first fixed portion including an elastic ring sleeve configured to sleeve couple with the first connecting member; and a second fixed portion connected with the second connecting member, wherein the first fixed portion and the second fixed portion are configured to connect with two opposite sides of the damper body, respectively.

17. The gimbal assembly of claim 16, wherein the damper structure further includes:

a separation-proof member connected with the damper and configured to cause the damper to abut against at least one of the first connecting member or the second connecting member through a stretching force generated by vibration of the damper.

18. The gimbal assembly of claim 16, wherein:

the second fixed portion includes a snap-in portion and a blocking portion connected with the snap-in portion;

the second connecting member includes a snap fit hole corresponding to the snap-in portion, the snap-in portion being insertable into the snap fit hole; and the blocking portion extends into the snap fit hole and rests on a surface of the second connecting member to restrain the snap-in portion from being separated from the snap fit hole.

19. An unmanned aerial vehicle, comprising:

an aircraft body; and a gimbal assembly, including:

a gimbal configured to carry a load; and a damping structure configured to connect the gimbal with the aircraft body, the damping structure including:

a first connecting member connectable with the gimbal;

a second connecting member connectable with the aircraft body;

a damper disposed between the first connecting member and the second connecting member, the damper including:

a damper body;

a first fixed portion including an elastic ring sleeve configured to sleeve couple with the first connecting member; and a second fixed portion connected with the second connecting member, wherein the first fixed portion and the second fixed portion are configured to connect with two opposite sides of the damper body, respectively.

20. The unmanned aerial vehicle of claim 19, wherein the damper structure further includes:

a separation-proof member connected with the damper and configured to cause the damper to abut against at least one of the first connecting member or the second connecting member through a stretching force generated by vibration of the damper.

* * * * *